United States Patent
Wallace et al.

(10) Patent No.: US 9,883,288 B2
(45) Date of Patent: Jan. 30, 2018

(54) COMPLIANT CONSTRAINED HEADBAND SPRING

(71) Applicant: BOSE CORPORATION, Framingham, MA (US)

(72) Inventors: Eric M. Wallace, Andover, MA (US); Michael J. Monahan, Framingham, MA (US); Derek James Butland, Westford, MA (US)

(73) Assignee: BOSE CORPORATION, Framingham, MA (US)

( * ) Notice: Subject to any disclaimer, the term of this patent is extended or adjusted under 35 U.S.C. 154(b) by 32 days.

(21) Appl. No.: 15/063,688

(22) Filed: Mar. 8, 2016

(65) Prior Publication Data

US 2017/0264992 A1 Sep. 14, 2017

(51) Int. Cl.
*H04R 5/033* (2006.01)
*H04R 1/10* (2006.01)
*F16F 1/18* (2006.01)

(52) U.S. Cl.
CPC ............. *H04R 5/0335* (2013.01); *F16F 1/18* (2013.01); *H04R 1/1041* (2013.01); *H04R 1/1066* (2013.01); *H04R 1/1008* (2013.01); *H04R 2460/17* (2013.01)

(58) Field of Classification Search
CPC .................... H04R 5/0335; H04R 1/1008
See application file for complete search history.

(56) References Cited

U.S. PATENT DOCUMENTS

| 1,167,368 | A | * | 1/1916 | Adams-Randall | ... H04R 5/0335 381/374 |
| 3,148,376 | A | * | 9/1964 | Aileo | ....... A42B 3/10 128/866 |
| 3,447,160 | A | * | 6/1969 | Teder | ....... A61F 11/14 2/209 |
| 4,409,442 | A | * | 10/1983 | Kamimura | ........... H04R 5/0335 381/370 |
| 4,571,746 | A | * | 2/1986 | Gorike | ................. H04R 5/0335 2/209 |
| 4,727,585 | A | * | 2/1988 | Flygstad | .............. H04R 5/0335 2/209 |
| 4,783,822 | A | * | 11/1988 | Toole | ....... H04M 1/05 2/209 |

(Continued)

FOREIGN PATENT DOCUMENTS

EP 0895439 A2 2/1999
EP 1971181 A2 9/2008
(Continued)

OTHER PUBLICATIONS

International Search Report and Written Opinion from corresponding International Application No. PCT/US2017/019307 dated Jun. 1, 2017.

*Primary Examiner* — Matthew Eason
(74) *Attorney, Agent, or Firm* — Lando & Anastasi, LLP

(57) ABSTRACT

A compliant constrained headband spring for audio headphones includes a headband spring element and a stiffness enhancing element coupled to the headband spring element. The compliant constrained headband spring exhibits a first stiffness in an open position and a second stiffness greater than the first stiffness when closed beyond a predetermined point.

17 Claims, 15 Drawing Sheets

(56) References Cited

U.S. PATENT DOCUMENTS

| | | | | |
|---|---|---|---|---|
| 6,056,082 A * | 5/2000 | Lindgren | A61F 11/12 128/864 |
| 6,138,790 A * | 10/2000 | Leight | A61F 11/12 128/857 |
| 7,614,091 B2 * | 11/2009 | LeGette | A61F 11/14 128/857 |
| 8,204,267 B2 * | 6/2012 | Leske | H04M 1/05 381/374 |
| 8,565,468 B2 * | 10/2013 | Ito | H04R 5/0335 381/370 |
| 9,167,335 B2 * | 10/2015 | Ito | H04R 5/0335 |
| 2001/0017925 A1 * | 8/2001 | Ceravolo | H04M 1/05 381/370 |
| 2003/0210801 A1 * | 11/2003 | Naksen | H04R 1/1066 381/370 |
| 2007/0165899 A1 * | 7/2007 | Garin | H04R 1/1066 381/377 |
| 2008/0056525 A1 | 3/2008 | Fujiwara et al. | |
| 2012/0140973 A1 * | 6/2012 | Olodort | H04R 1/1066 381/375 |
| 2014/0205129 A1 * | 7/2014 | Blair | H04R 1/1058 381/378 |
| 2014/0263493 A1 * | 9/2014 | Amurgis | H04R 5/0335 224/181 |
| 2017/0019729 A1 * | 1/2017 | Cochran | H04R 1/1091 |

FOREIGN PATENT DOCUMENTS

| | | |
|---|---|---|
| GB | 2304488 A | 3/1997 |
| WO | 2016077247 A1 | 5/2016 |

* cited by examiner

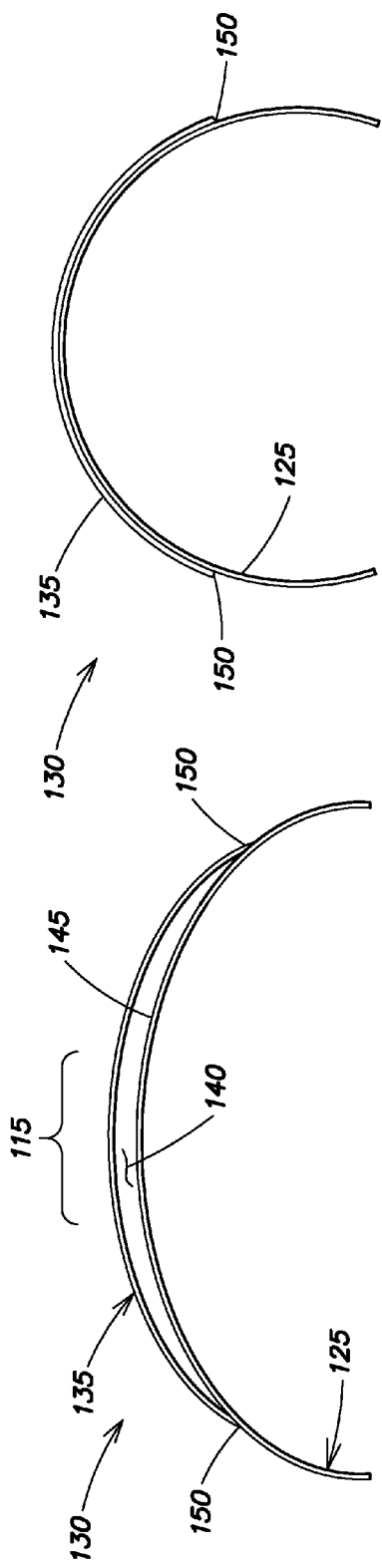
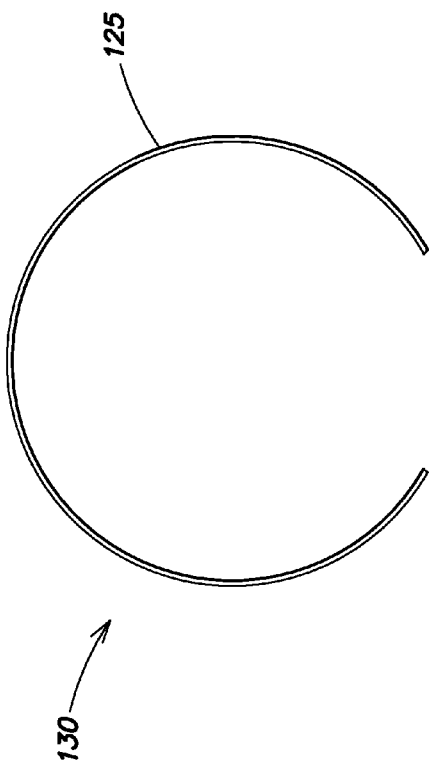
FIG. 4A
FIG. 4B
FIG. 4C

COMPLIANT CONSTRAINED HEADBAND SPRING

TECHNICAL FIELD

Aspects and implementations of the present disclosure are directed generally to audio headphones and specifically to headbands for same.

BACKGROUND

Over-the-ear audio headphones (e.g., around-ear and on-ear headphones) typically include a pair of earcups including speaker elements and a headband coupling the earcups to one another. The headband is worn over the head of a user and positions the earcups on or about the ears of the user. The headband may include a compliant mechanism, for example, a leaf spring, that applies force through the earcups to the head and/or ears of the user to maintain the earcups in place on or about the ears of the user and acoustically couple the earcup acoustics to the ears of the user.

SUMMARY

In accordance with an aspect of the present disclosure, there is provided a compliant constrained headband spring of a headband for audio headphones. The compliant constrained headband spring comprises a headband spring element and a stiffness enhancing element coupled to the headband spring element. The compliant constrained headband spring exhibits a first stiffness in an open position and a second stiffness greater than the first stiffness when closed beyond a predefined point at which terminal ends of the headband spring element are at a predefined distance from one another.

In some examples, in the absence of external force and in the absence of the stiffness enhancing element, the headband spring element closes to a point at which earcups mounted on the terminal ends of the headband spring element contact one another. The stiffness enhancing element has sufficient stiffness to prevent the compliant constrained headband spring from closing to a point at which earcups mounted on the terminal ends of the headband spring element contact one another.

In some examples, the predefined distance is within a range of between about 50 mm and about 121 mm.

In some examples, the stiffness enhancing element is disposed on an outer surface of the headband spring element over at least a central region of the headband spring element. The stiffness enhancing element may comprise a strap coupled to the headband spring element at connection points on opposing sides of the headband spring element. The stiffness enhancing element may be coupled to a retainer block coupled to the headband spring element.

In some examples, a terminal end of the stiffness enhancing element comprises a portion with a cross-sectional area greater than a cross-sectional area of a central portion of the stiffness enhancing element. The terminal end of the stiffness enhancing element may be disposed within a groove in the retainer block. The terminal end of the stiffness enhancing element may be configured to travel through the groove as the compliant constrained headband spring is opened and/or closed. The terminal end of the stiffness enhancing element may be retained in the retainer block by a shoulder defined in the retainer block.

In some examples, the compliant constrained headband spring further comprises a feature to adjust an effective length of the stiffness enhancing element. The feature may comprise a threaded screw disposed in the retainer block that engages threads on the terminal end of the stiffness enhancing element. The feature may comprise a plurality of apertures defined in the headband spring element at different distances from a center portion of the headband spring element, and configured to releasably retain a base of the retainer block.

In some examples, the stiffness enhancing element is coupled to the headband spring element at connection points on opposing sides of the headband spring element. The stiffness enhancing element may be configured to displace from the central region of the headband spring element upon opening of the headphones, forming a gap between a surface of the headband spring element and the stiffness enhancing element.

In some examples, the stiffness enhancing element comprises at least one of a fiber reinforced polymer, a metal, a wire, an elastomeric material or a braided cable.

In some examples, the stiffness enhancing element is disposed on an inner surface of the headband spring element over a central region of the headband spring element. Terminal ends of the stiffness enhancing element may be disposed on tabs extending from the inner surface of the headband spring element. The terminal ends of the stiffness enhancing element may displace from inner surfaces of the headband spring element upon opening of the headband, forming gaps between the terminal ends of the stiffness enhancing element and the inner surfaces of the headband spring element.

In some examples, the stiffness enhancing element comprises a first portion and a second portion. An arc length adjustment device may be disposed between the first portion and the second portion.

In some examples, the compliant constrained headband spring is included in a pair of audio headphones.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4A is a schematic illustration of an example of a compliant constrained headband spring for a pair of audio headphones in an open state;

FIG. 4B is a schematic illustration of the compliant constrained headband spring of FIG. 4A in a closed state;

FIG. 4C is a schematic illustration of a comparative example of a headband spring for a pair of audio headphones in a closed state;

DETAILED DESCRIPTION

Figure 1:
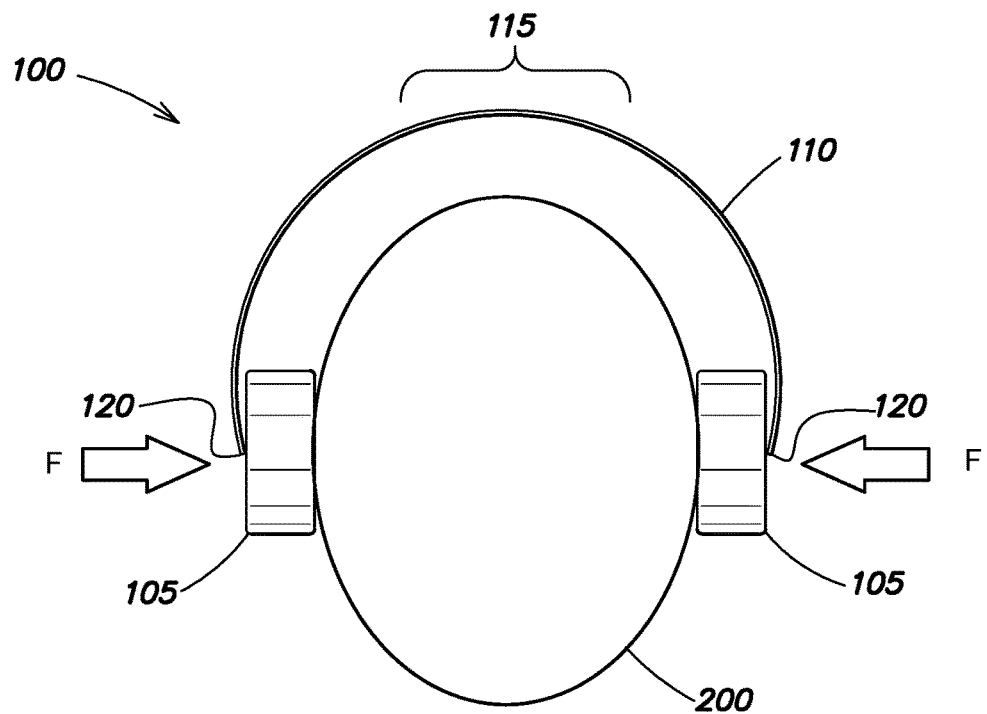
FIG. 1 is a schematic illustration of audio headphones on the head of a user.

Aspects and implementations disclosed herein are not limited to the details of construction and the arrangement of components set forth in the following description or illustrated in the drawings. Aspects and implementations disclosed herein are capable of being practiced or of being carried out in various ways.

Aspects and implementations disclosed herein are generally directed to audio headphones (referred to hereinafter as simply "headphones") and to headbands for same. The headphones may be over-the-ear headphones such as on-ear or around-ear headphones or banded in-ear headphones. Alternatively, the headphones may have ear pieces with acoustic drivers that are that are located off a user's ears but with a headband to connect and retain the ear pieces in a desired position. Aspects and examples of the audio headphone headbands disclosed herein may provide for increased comfort and aesthetics as compared to presently known audio headphone headbands.

For the sake of clarity the following terminology to be used throughout this disclosure is defined. FIG. 1 depicts a schematic of a pair of headphones 100 disposed on the head 200 of a user. Headphones 100 include a pair of earcups 105 and a headband 110. The portion of the headband 110 of the headphones 100 disposed above the head 200 of the user is referred to herein as the central portion 115 of the headband 110. The portions of the headband 110 proximate to or coupled to the earcups 105 are referred to herein as end or terminal portions 120 of the headband 110. The headband 110 exerts forces F on the earcups 105 in a direction toward the head 200 of the user. The direction of forces F is referred to herein as an inward direction. A direction opposite to that of forces F is referred to herein as an outward direction. When the terminal portions 120 of the headband 110 and/or the earcups 105 and a headband 110 move in the inward direction, this is referred to herein as the terminal portions 120 of the headband 110 and/or the earcups 105 closing or moving toward a closed position. When the earcups 105 are in a position such that the earcups 105 are close to one another, typically when the headphones are removed from the head 200 of the user and no external force is applied to the headband 110, the headphones 100 are considered to be in a closed position. The headphones 100 may also be considered to be in a closed position when the headband 110 exerts no force biasing the earcups 105 toward or away from one another. When the terminal portions 120 of the headband 110 and/or the earcups 105 of the headband 110 move in the outward direction, this is referred to herein as the terminal portions 120 of the headband 110 and/or the earcups 105 opening or moving toward an open position. Linguistic variations of this terminology, for example, changes in tense, utilization as nouns, verbs, or adjective, etc., or application of these terms to other elements or features disclosed herein should not be considered to change the meaning of these terms.

The forces F that hold the earcups 105 of headphones 100 against the ears and/or head 200 of a user are typically generated by forming at least a portion of the headband 110 with or as a spring. The headband spring often includes an arcuate length of spring material, for example, spring steel or another compliant material. The strength of the forces F generated by a headband spring may be dependent on factors such as the dimensions, for example, thickness, width, degree of curvature, etc. of the headband spring and/or the material of construction of the headband spring.

In some examples, the he earcups 105 may be secured directly to opposite terminal ends 120 of the headband spring. In other examples, the earcups 105 may be indirectly coupled to the headband spring by one or more intervening elements. The headband spring may be housed within a shell, lining, cover or housing of the headband 110. Some examples of headphones 100 include headbands 110 having cushioning to increase the comfort of the headphones when worn by a user. For the sake of clarity, headband shells, linings, covers, housings, and cushioning are not illustrated in the figures accompanying this disclosure.

Some headbands 110 are compliant and offer fairly consistent clamping force, comfort, and stability across a full range of user head 200 sizes, for example, with earcup separations of between 121 mm to 155 mm when the headphones are on a user, which spans the 5th to 95th percentile for adult human head (ear-to-ear) widths. To achieve this result, a high compliance headband spring is used. Such a high compliance headband spring may exert a clamping force of between about 200 grams and about 400 grams when worn on a user's ears (for users in the 5th to 95th percentile for adult human head (ear-to-ear) widths), and in some examples, about 275 grams for a median-sized human head. In other examples a high compliance headband spring may exert a clamping force of between about 3.5 Newtons (N) and about 4.5 N when worn on a user's ears (for users in the 5th to 95th percentile for adult human head (ear-to-ear) widths). With such a high compliance spring, it takes significantly more deflection to achieve a desired preload and stability for small heads. The result from this high compliance spring is a headband 110 that, in the absence of an external force, compresses the earcups 105 together in a closed state when the headband is in a free state off of the head 200 of a user. The closed state of headphones 100 including such a high compliance headband spring 125 is illustrated schematically in FIG. 2.

Figure 2:
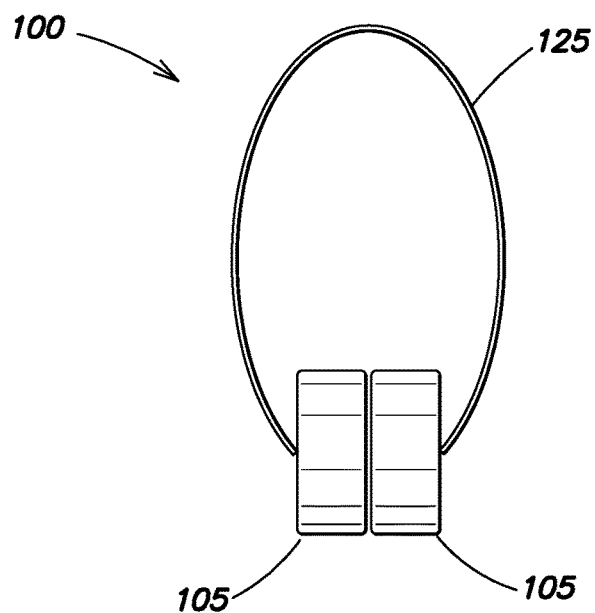
FIG. 2 is a schematic illustration of an example of a pair of audio headphones.

The look of the closed state of the headphones 100 illustrated in FIG. 2 is considered less aesthetically pleasing than desired to some users. For example, some users of headphones 100 prefer to wear their headphones 100 about the neck when not in use and consider it to be aesthetically pleasing that there be a gap between the earcups 105 when the headphones 100 are worn about the neck. Such a look is illustrated schematically in FIG. 3. In some existing headphones 100 including high compliance headband springs 125, for example, as illustrated in FIG. 2, when worn about the neck, the headphones 100 may close so much that they squeeze the neck and cause discomfort. Further, in some instances, it is undesirable that the earcups 105 of headphones 100 contact one another when in a closed state because friction between the earcups 105 may cause wear and/or damage to the earcups 105.

Figure 3:
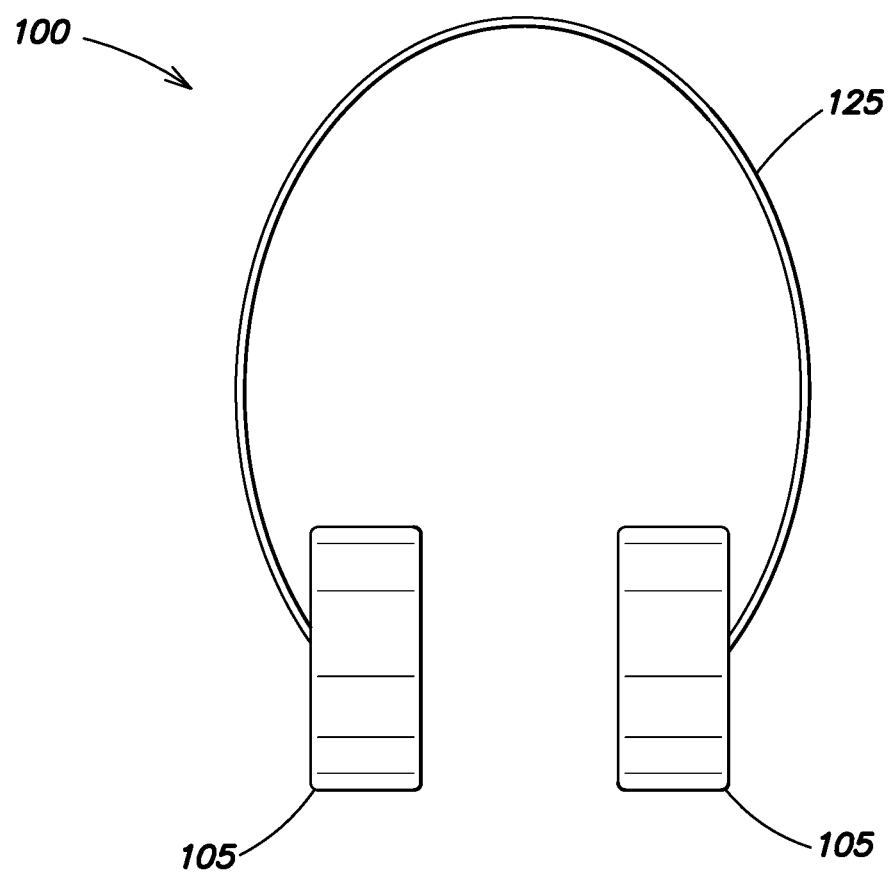
FIG. 3 is a schematic illustration of another example of a pair of audio headphones.

Other examples of headphones 100 include headbands 110 that maintain the earcups 105 spaced from one another when off head and in a free state, for example, as illustrated schematically in FIG. 3. Examples of headband springs 125 utilized to achieve this look are much stiffer than the high compliance headband spring 125 utilized in the example of headphones 100 illustrated in FIG. 2. Such stiffer headband springs 125 often yield inconsistent levels of comfort and stability across a range of user head 200 sizes. Such stiffer headband springs 125 also often deliver higher clamping force when worn, for example, between about 400 grams and about 700 grams (for 5th to 95th percentile human head (ear-to-ear) sizes), or in other examples, between about 5 N and about 8 N (for 5th to 95th percentile human head (ear-to-ear) sizes), which may be less comfortable for a user than the high compliance headband spring 125 utilized in the example of headphones 100 illustrated in FIG. 2, especially for users with larger heads.

In accordance with some aspects and examples disclosed herein, it is possible to maintain consistent spring force across multiple head sizes (i.e. maintain the level of comfort and stability offered by existing headbands including high compliance headband springs, for example, as illustrated in FIG. 2) with a headband that maintains earcups 105 spaced from one another when the headphones are off head. Some aspects and examples disclosed herein provide for the consistent spring force across multiple head sizes exhibited by high compliance headband springs while also providing improved parking comfort around the neck. In accordance with some aspects and examples disclosed herein, when worn about the neck of a user, the headband 110 will maintain the earcups 105 spaced from one another and not squeeze the neck of the user.

In accordance with some aspects and examples disclosed herein, a headband spring 125 for a headphone 100 may be modified to include a stiffness enhancing member that effectively increases the stiffness of the headband spring 125 as the headband spring 125 closes, transitions from an open to a closed state, or closes beyond a state of openness exhibited when worn on the head 200 of a typical user (a user having an ear-to-ear spacing within the 5th percentile to the 95th percentile of ear-to-ear spacing of adult human users). In some examples, the stiffness enhancing member effectively increases the stiffness of the headband spring 125 as the headband spring 125 closes to a point at which terminal ends 120 of the headband spring 125 are less than about 155 mm from one another, less than about 121 mm from one another, or between about 50 mm and about 100 mm from one another. In some examples, the degree of openness at which the stiffness enhancing member effectively increases the stiffness of the headband spring 125 may be adjustable, for example, to be at a point at which terminal ends 120 of the headband spring 125 are anywhere between about 0 mm and about 155 mm or more from one another. In some examples, the modified headband spring 125 may exhibit substantially similar or the same stiffness as a non-modified headband spring 125 of comparable material (s) and dimensions when worn on the head 200 of a user, but exhibit increased stiffness as compared to the non-modified headband spring 125 when closed to a state where terminal ends 120 of the headband spring 125 are closer together than when worn on the head 200 of the user.

In some examples, a conventional high compliance headband spring 125 (hereinafter, a headband spring element 125) may be modified to include a stiffness enhancing member on an upper and/or lower surface of a central portion 115 of the headband spring element 125. In some examples, the stiffness enhancing member is a high tensile stiffness/modulus and flexible strap that keeps the headband spring element 125 of a pair of headphones 100 from closing when in a free state off of the head 200 of a user while allowing the earcups 105 to compress onto the head and/or ears of a user when the headphones 100 are worn by the user. In other examples, the stiffness enhancing member is a flexible member that is under a state of tension and elongation when the headband spring 125 is closed in a state where terminal ends 120 of the headband spring 125 are closer together than when worn on the head 200 of the user and/or at distance from one another that would be exhibited when worn on the head 200 of a typical user. The modification to the conventional headband spring 125 may have very little to no impact on the spring force when pulling the earcups 105 apart or wearing the headphones 100. In some examples, the stiffness enhancing member exhibits very little or no creep to maintain the degree of openness of the headband spring element 125 in a free state off head over time.

FIG. 4A illustrates a modified headband spring 130 in an open state, for example, as worn on the head 200 of a user, including a stiffness enhancing member comprising a high stiffness/modulus, low creep strap 135 coupled to an upper or outer surface 145 of an otherwise unmodified headband spring element 125 at coupling points 150 on either side of a central portion 115 of the headband spring 130. While the strap 135 is illustrated as being coupled to an upper or outer surface 145 of the headband spring element 125, it could also be coupled to a lower or inner surface of the headband spring element 125. The coupling points 150 may be provided at an intermediate point between the central portion 115 of the headband spring 130 and the outer ends of the headband spring 130 as illustrated in FIGS. 4A and 4B, or the coupling points 150 may be provided closer to the outer ends of the headband spring 130, so that the strap 135 spans most or all of the headband spring 130. In the open configuration, the strap 135 is pushed upward and forms a space or gap 140 between the upper surface 145 of the headband spring element 125 and the strap 135. When headphones 100 including the modified headband spring 130 are removed from the ears and head 200 of a user, the headband spring 130 closes into a configuration illustrated in FIG. 4B, such that there is a gap between the ends of the headband spring 130, where earcups may be mounted. The headband spring 130 is prevented from closing to a greater degree than what is illustrated in FIG. 4B by the strap 135. The closed state of the headband spring 130 is more open than the closed state that the headband spring element 125 would exhibit in the absence of the strap 135, illustrated in FIG. 4C. The earcups 105 are not illustrated in FIGS. 4A-4C for clarity.

In some examples, the strap 135 may be formed from a high tensile stiffness, flexible, and low creep polymer or composite, for example, fiberglass or a carbon fiber reinforced epoxy. In some examples the strap 135 may be formed from a metal or alloy, for example, spring steel of a same or different grade than that of headband spring element 125. In some examples, the strap 135 comprises a wire or a cable, for example, a braided metal cable, in some instances, a braided steel cable. In some examples, the strap 135 comprises a fiber or group of fibers, for example, a glass fiber or braided glass fibers, a carbon fiber or braided carbon fibers, or fibers or braided groups of fibers of other materials. In other examples, the strap 135 comprises a compliant material, for example a strip or body of rubber, an elastomeric material, or other material that may exhibit an increase in a force resisting further elongation and/or an increase in elastic modulus as the strip or body is elongated.

Figure 4D:
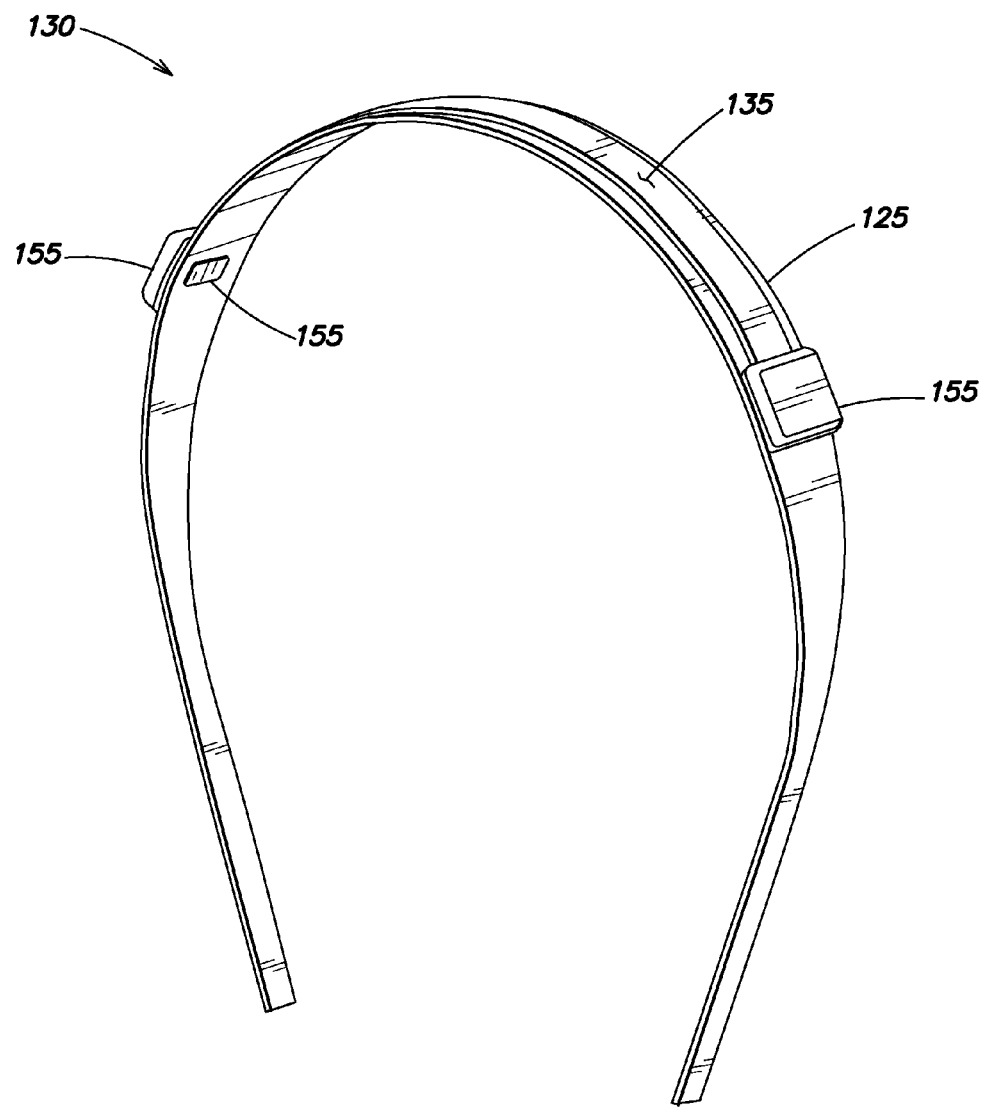
FIG. 4D is an isometric view of another example of a compliant constrained headband spring for a pair of audio headphones.
Figure 4E:
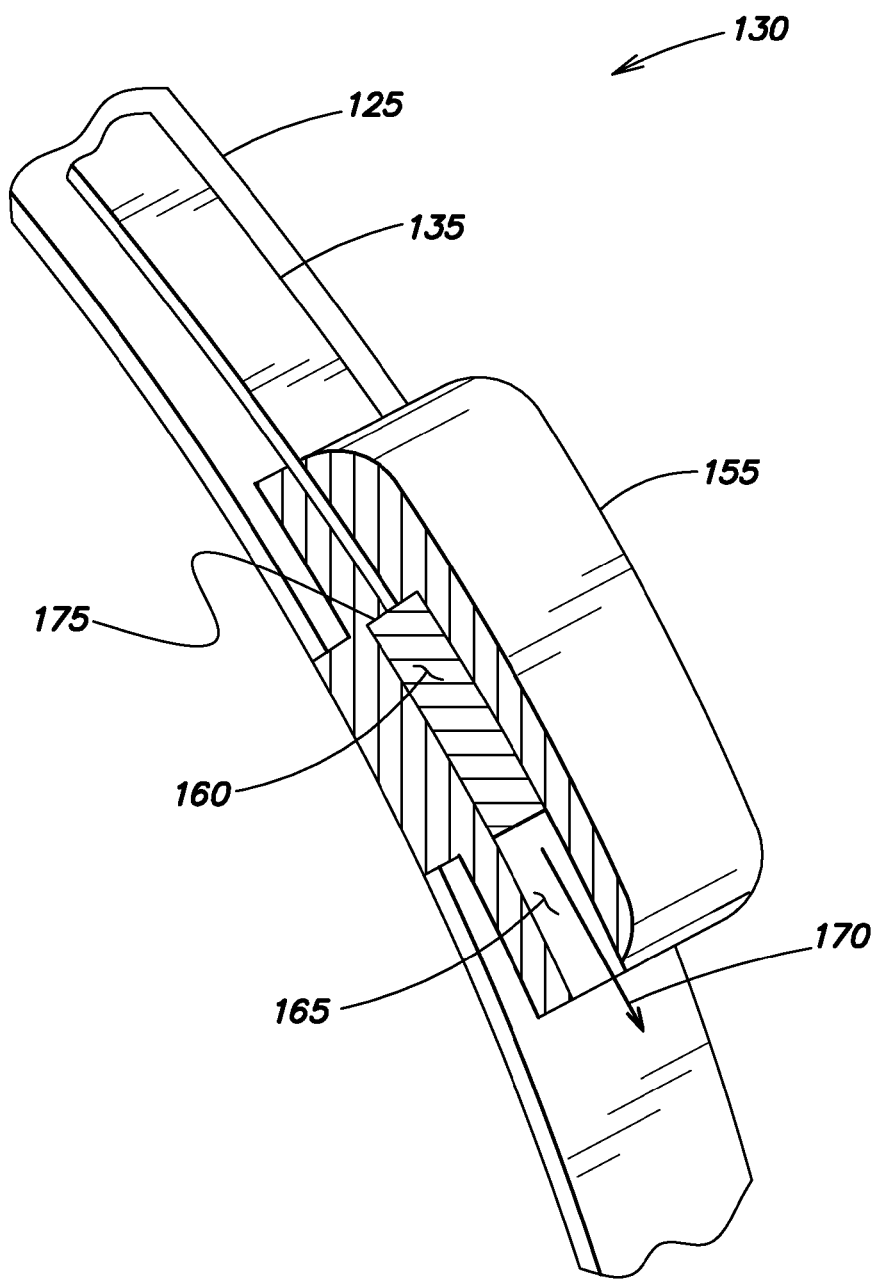
FIG. 4E is a partial cross-sectional view of a retainer block element of the headband spring of FIG. 4D.

The strap 135 may be secured to the headband spring element 125 at the connection points 150 by welding, rivets, screws, nuts and bolts, clips, hinges, or other mechanical fasteners known in the art. In other examples, one of the strap 135 and the headband spring element 125 may include a slot, groove, or grooves and the other of the strap 135 and the headband spring element 125 may include a protrusion or protrusions that slide through the groove(s) upon opening and closing of the headband spring 130, for example, as illustrated in FIG. 4E or FIG. 5H. The protrusion or protrusions may freely slide through the groove(s), thus not impacting the stiffness of the headband spring 130 until the headband spring 130 is closed to a degree at which the protrusion or protrusions reach an end of the groove or grooves and cannot travel further and thus increase the stiffness of the headband spring 130. The protrusion or protrusions may be retained in the groove or grooves by an expanded width head or terminal portion that cannot fit through the width of the groove. For example, as illustrated in FIG. 4D and FIG. 4E (showing a partial cross section of the retainer block of FIG. 4D), a headband spring element 125 may include one or more retainer block elements 155 coupled to the headband spring element 125. An end portion of the stiffness enhancing element 135 having a greater cross-sectional area than a central portion of the stiffness enhancing element 135, for example, a widened and/or thickened end portion 160 of the strap 135, may freely pass through an aperture 165 in one of the retainer block elements 155, for example, in the direction of arrow 170 in FIG. 4E, when the headband spring 130 is opened. The widened and/or thickened end portion 160 of the strap 135 may be constrained from moving a predetermined distance opposite to the direction of arrow 170 when the headband spring 130 is closed beyond a predefined point by a shoulder 175 internal to the retainer block element 155.

Figure 4F:
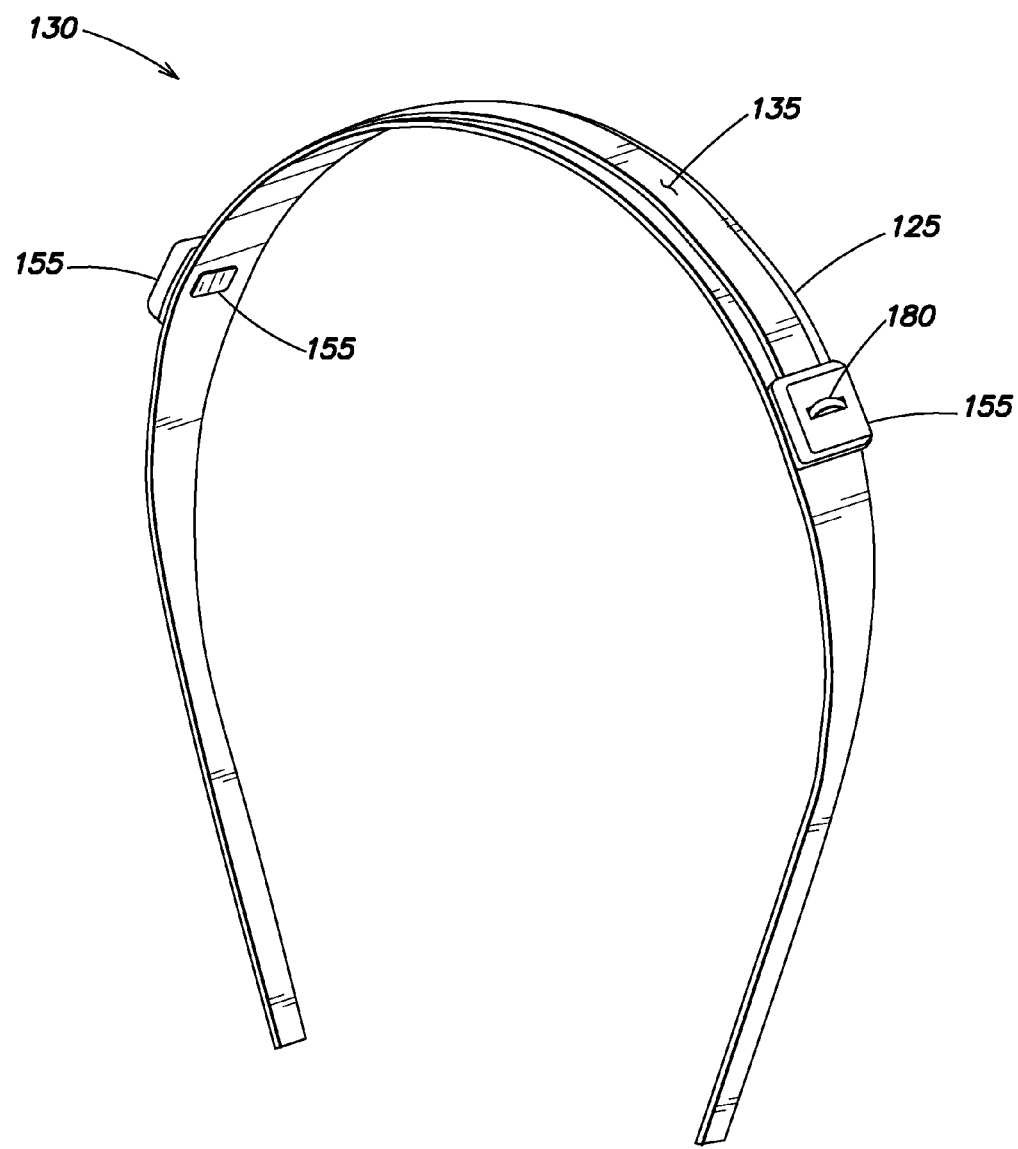
FIG. 4F is an isometric view of another example of a compliant constrained headband spring for a pair of audio headphones.
Figure 4G:
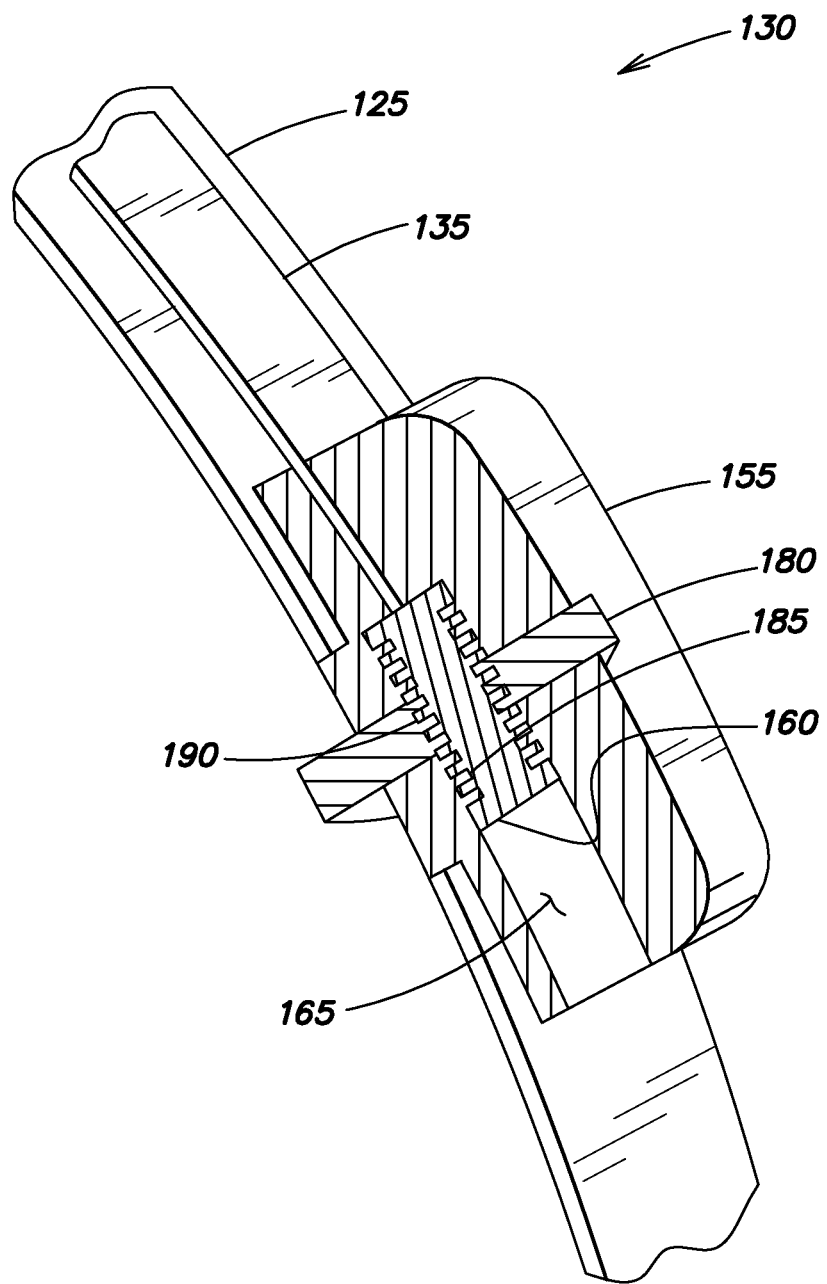
FIG. 4G is a partial cross-sectional view of a retainer block element of the headband spring of FIG. 4F.

The headband spring 130 may include an arc length adjustment device to fine tune the openness and/or effective stiffness of the headband spring 130. As illustrated in FIGS. 4F and 4G, an adjustment mechanism 180, for example, a thumb nut or other wheel-like actuator or adjustment screw may be mounted in one or more of the retainer block elements 155. Internal threads 185 on the thumb nut 180 may engage threads 190 on the outside of the expanded end portion 160 of the strap 135 to move the expanded end portion 160 of the strap 135 into different positions within the aperture 165 in the retainer block element 155. In some examples, the thumb nut 180 may be sized and/or the aperture 165 may be positioned such that the thumb nut 180 does not protrude into the user's head side (the inside) of the headband spring element 125. In other examples, the thumb nut 180 may include a portion that protrudes into the user's head side (the inside) of the headband spring element 125 as illustrated in FIG. 4G, but is located in a position where there is normally a spacing between the headband spring element 125 and the user's head so the thumb nut 180 would not contact the user's head.

Figure 4H:
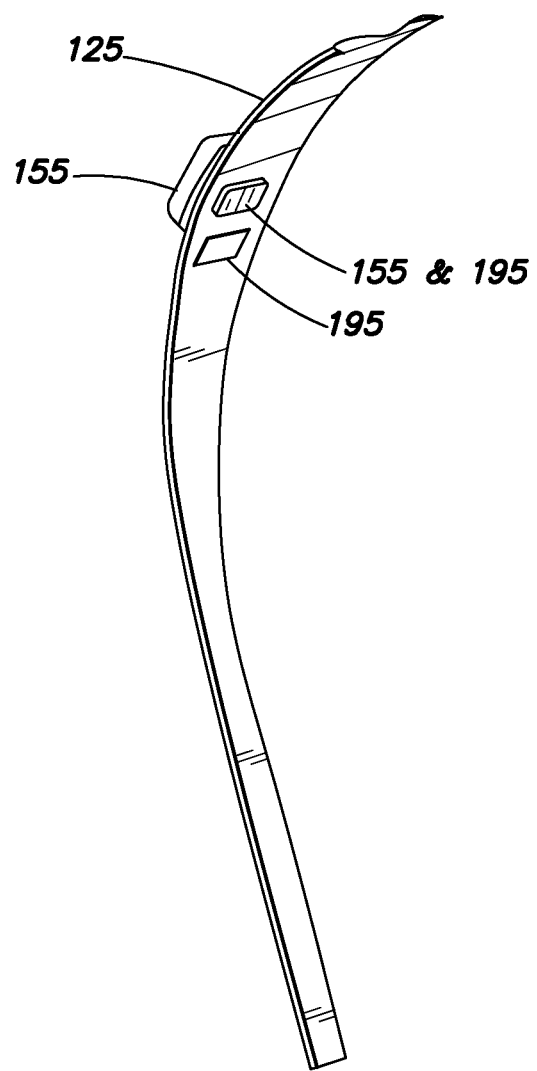
FIG. 4H is an isometric view of a portion of another example of a compliant constrained headband spring for a pair of audio headphones.

In a further example, fine tuning the openness and/or effective stiffness of the headband spring 130 may be accomplished by adjusting the position of one or more of the retainer block elements 155 on the headband spring element 125. For example, as shown in FIG. 4H, the headband spring element 125 may be provided with multiple apertures 195 into which a retainer block element 155 may be fitted, for example, with a reversible snap fitting or forming the base of the retainer block element 155 to adjust the tension applied by the strap 135 to the headband spring element 125 or a degree of closure of the headband spring element 125 at which the strap 135 would engage the headband spring element 125 and increase the stiffness of the headband spring 130. Other stiffness adjustment mechanisms are also contemplated, for example, a lever actuated buckle or a ratcheting device that provide for a position of a retainer block element 155 to be adjusted.

Figure 5A:
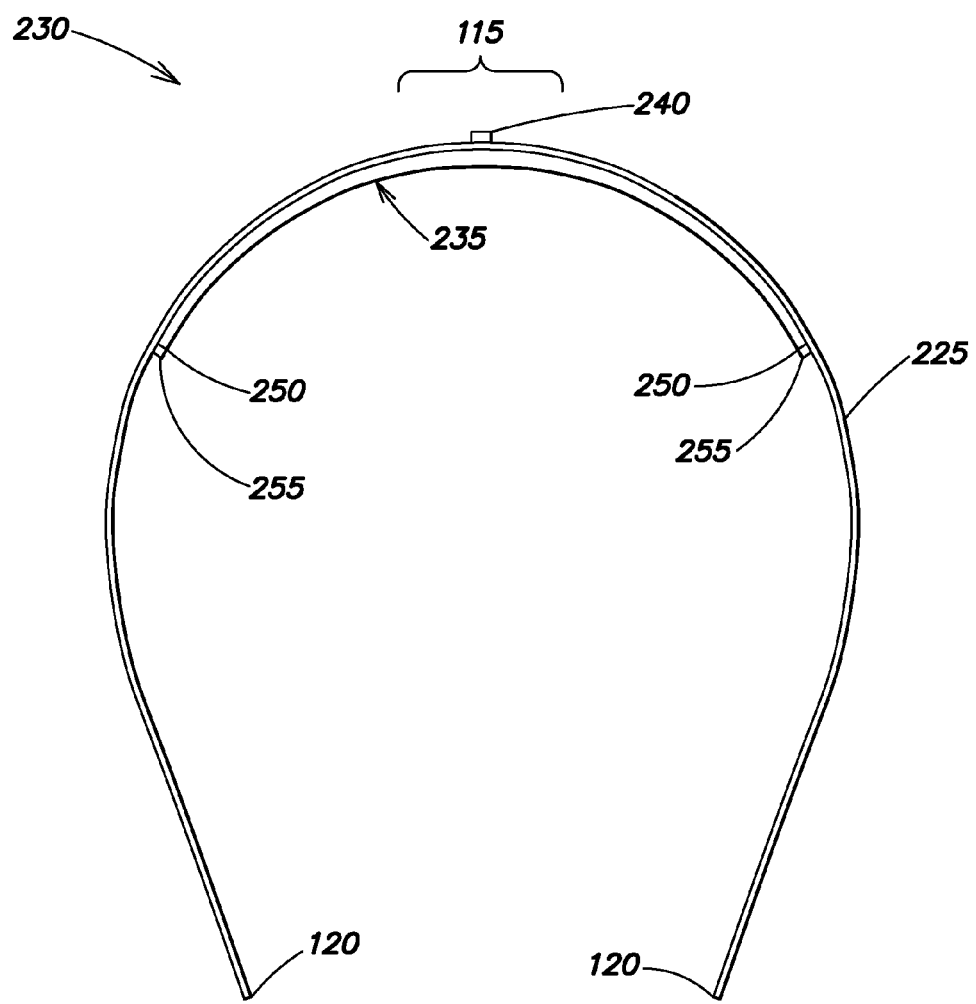
FIG. 5A is an elevational view of another example of a compliant constrained headband spring for a pair of audio headphones.
Figure 5B:
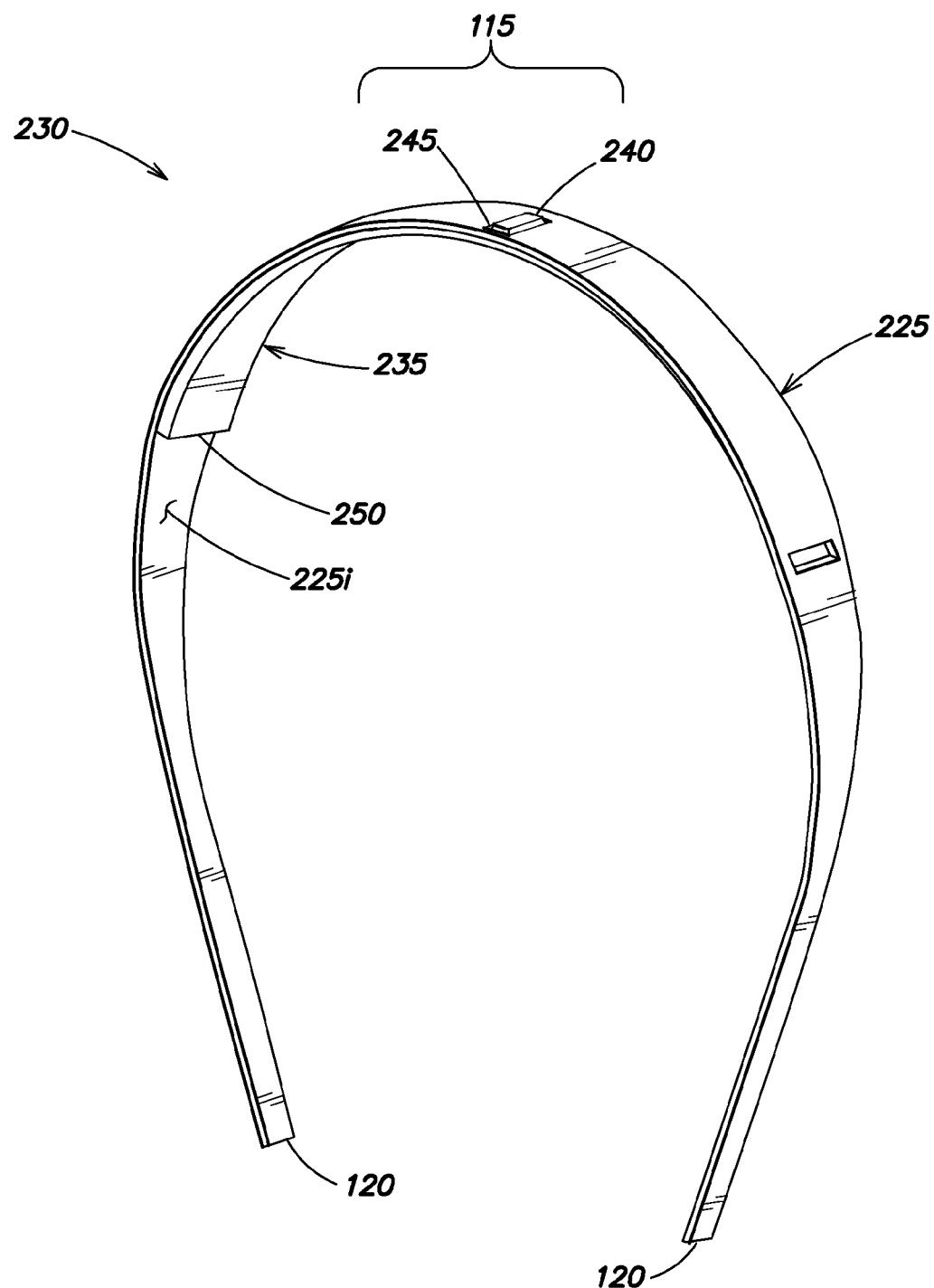
FIG. 5B is a isometric view of the compliant constrained headband spring of FIG. 5A.
Figure 5C:
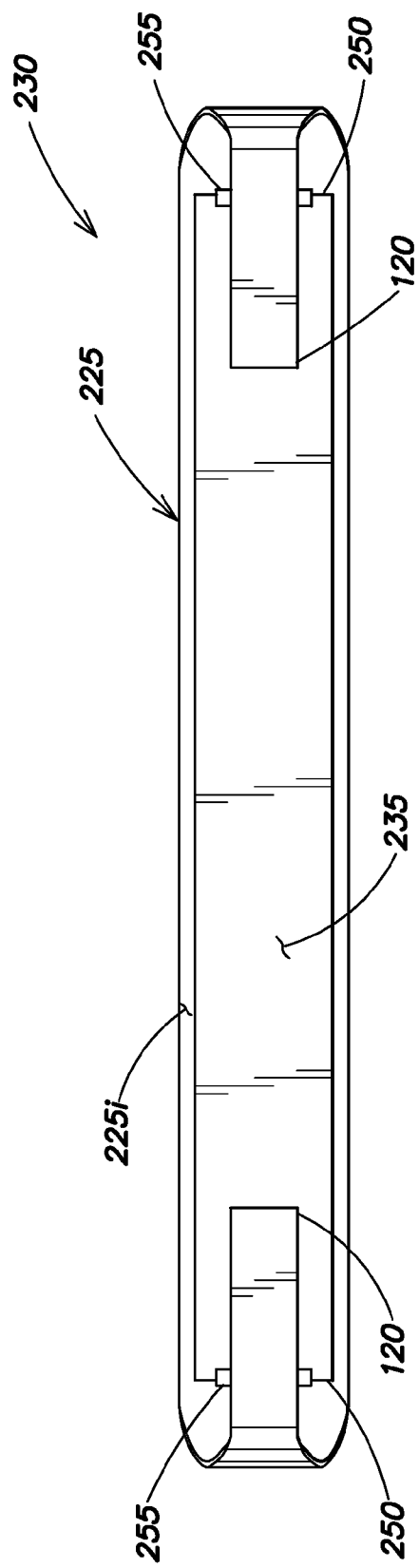
FIG. 5C is a plan view from beneath the compliant constrained headband spring of FIG. 5A.

In another example, for example, as illustrated in FIGS. 5A, 5B, and 5C a modified headband spring 230 may be formed with a stiffness enhancing element disposed on an inner surface 225i of a headband spring element 225. While the stiffness enhancing element is illustrated as being disposed on an inner surface 225i of headband spring element 225, the stiffness enhancing element could also be disposed on an outer surface of headband spring element 225. The headband spring element 225 may be substantially similar to and formed from substantially the same material(s) as headband spring element 125. The stiffness enhancing element includes a body or material strip 235 that is stiff in compression and/or in tension. The material strip 235 may be formed from, for example, a low creep polymer or composite, for example, fiberglass or a fiber (for example, carbon fiber) reinforced epoxy. In other examples, the material strip 235 may be a compliant material, for example, rubber, an elastomeric material, or another material that exhibits an increase in a force resisting further compression and/or elongation and/or an increase in elastic modulus as the strip or body is compressed and/or elongated.

Figure 5D:
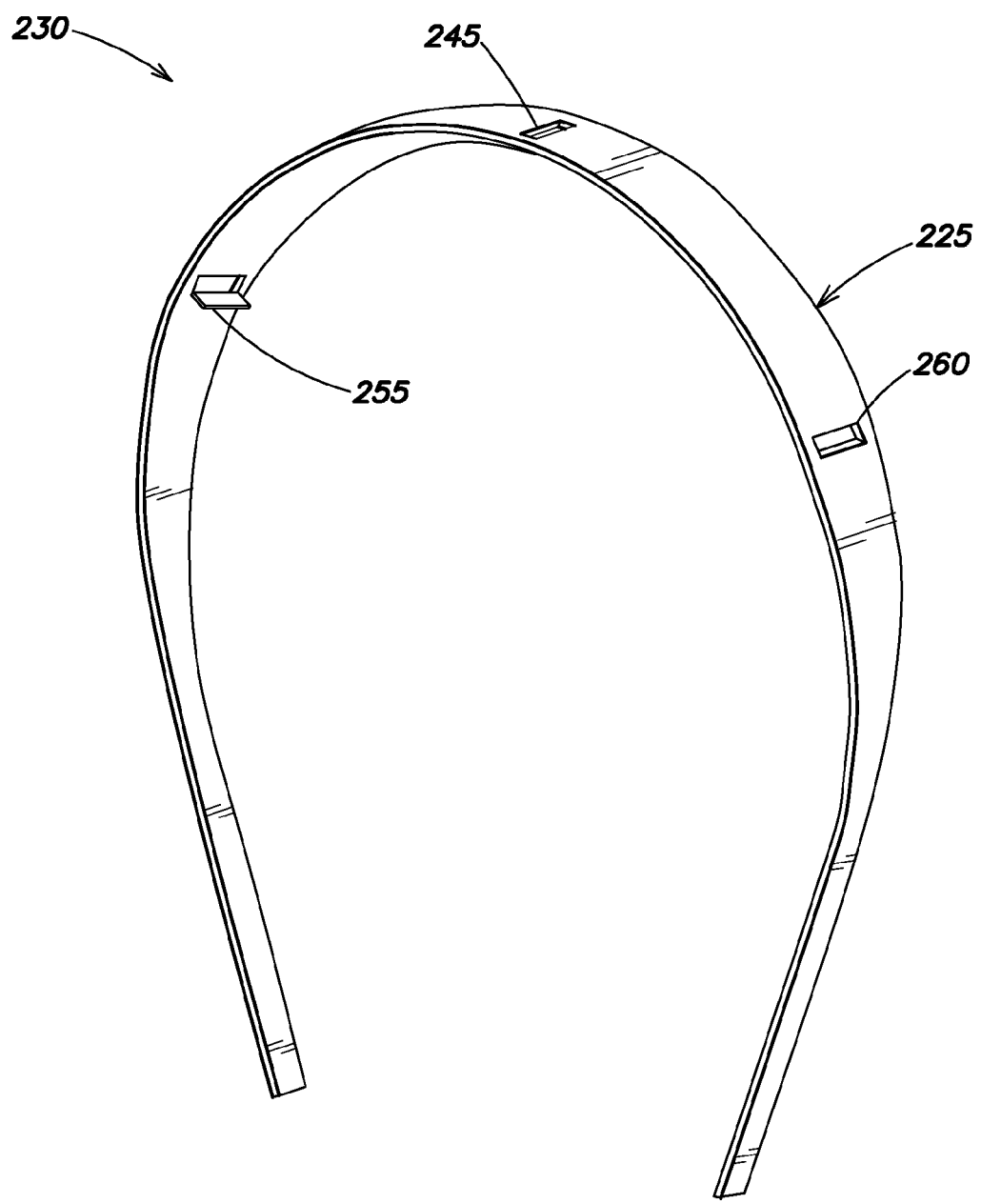
FIG. 5D is an isometric view of the headband spring element of the headband spring of FIG. 5A.

The material strip 235 is connected to the headband spring element 225 by a protrusion 240 on the material strip 235 that passes through and/or is secured in an aperture 245 in the central portion 115 of the headband spring element 225. In other examples, the material strip 235 is connected to the headband spring element 225 by one or more protrusions 240 disposed in additional or alternate positions than that illustrated. In some examples, the protrusion 240 is mushroom shaped or otherwise shaped such that it snaps in place in the aperture 245. End portions 250 of the material strip 235 may rest on or be secured to tabs 255 extending inward from the inner surface 225i of the headband spring element 225 between the central portion 115 of the headband spring element 225 and terminal portions 250 of the headband spring element 225. The headband spring element 225 is illustrated without the material strip 235 in FIG. 5D to better illustrate the tabs 255 and associated tab apertures 260 and aperture 245. The material strip 235 increases the stiffness of the modified headband spring 230 as compared to the stiffness of the headband spring element 225 in the absence of the material strip 235 when the headband spring 230 is closed beyond a predefined point.

In other examples, the end portions 250 of the material strip 235 may be secured to the headband spring element 225 by protrusions passing through slots in the headband spring element 225 (or by protrusions from the headband spring element 225 that pass through slots in the material strip 235). In such examples, portions of the material strip 235 may slide relative to portions of the headband spring element 225 as the modified headband spring 230 is opened or closed. In some examples, the protrusions may engage ends of the slots upon closing the headband spring 230 past a predetermined closing point. The modified headband spring 230 may thus exhibit increased stiffness due to interaction with the material strip 235 as a user attempts to close the modified headband spring 230 beyond the predetermined closing point. For example, the modified headband spring 230 may include retainer block elements 155 such as those illustrated in FIGS. 4D-4H disposed on internal sides of the headband spring element 225 and engaging the end portions 250 of the material strip 235, which, in some examples, includes enlarged cross-sectional area terminal portions, similar to expanded thickness end portion 160 of the strap 135 illustrated in FIGS. 4E and 4G.

Figure 5E:
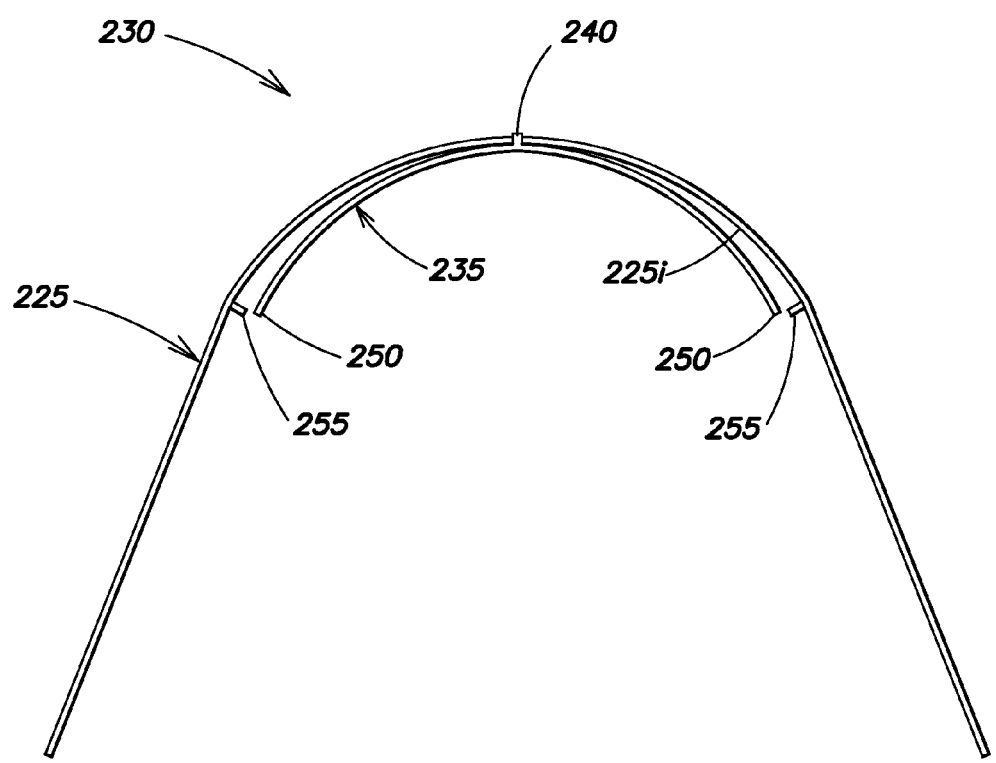
FIG. 5E is an elevational view of the headband spring of FIG. 5A in an opened state.

In other examples, the end or terminal portions 250 of the material strip 235 are not fixedly secured to the inner surface 225i of the headband spring element 225 or the tabs 255. As the modified headband spring 230 is opened beyond a predetermined point the end portions 250 of the material strip 235 may disengage from the inner surface 225i of the headband spring element 225 or the tabs 255 and a gap or gaps may form between the end portions 250 of the material strip 235 and the inner surface 225i of the headband spring element 225 and/or the tabs 255. This is illustrated in FIG. 5E. The end portions 250 of the material strip 235 may thus only engage the inner surface 225i of the headband spring element 225 or the tabs 255 and increase the stiffness of the modified headband spring 230 when the modified headband spring 230 is closed beyond the predetermined point.

The end or terminal portions 250 of the material strip 235 may be provided at an intermediate point between the central portion 115 of the headband spring 230 and the outer ends 120 of the headband spring 130 as illustrated in FIGS. 5A-5C, or the end or terminal portions 250 may be provided closer to the outer ends 120 of the headband spring 230, so that the material strip 235 spans most or all of the headband spring 230.

The headband spring 230 may include an arc length adjustment device to fine tune the openness and/or effective stiffness of the headband spring 230. For example, as described above, the end portions 250 of the material strip 235 may include enlarged cross-sectional area terminal portions, similar to expanded thickness end portion 160 of the strap 135 illustrated in FIGS. 4E and 4G above that are retained in retainer block elements 155 such as those illustrated in FIGS. 4D-4H above. The end portions 250 of the material strip 235 may include threaded portions that engage threads of an adjustment mechanism 180, for example, a thumb nut or other wheel-like actuator or adjustment screw that may be mounted in one or more of the retainer block elements 155 as illustrated in FIG. 4G above.

Figure 5F:
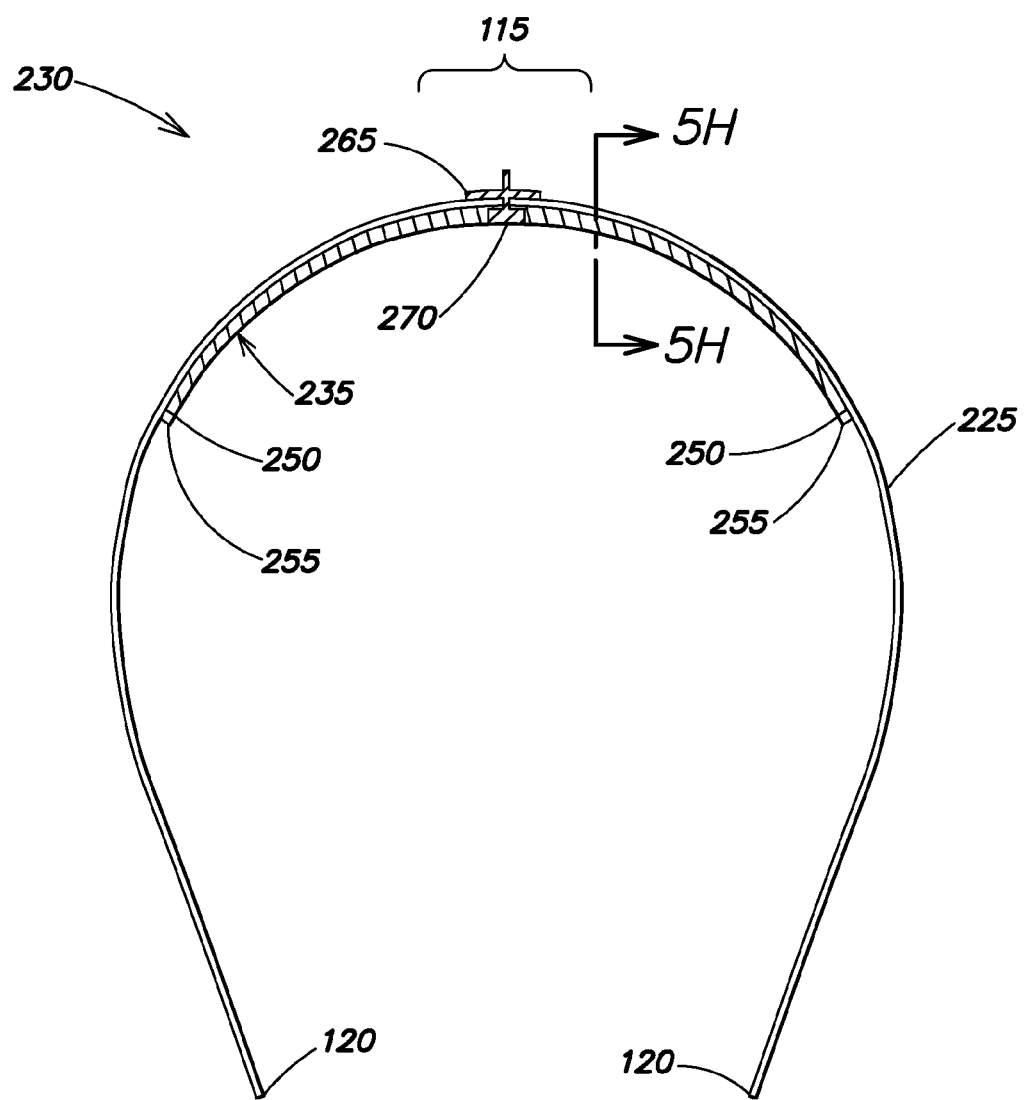
FIG. 5F is an elevational view of another example of a compliant constrained headband spring for a pair of audio headphones.
Figure 5G:
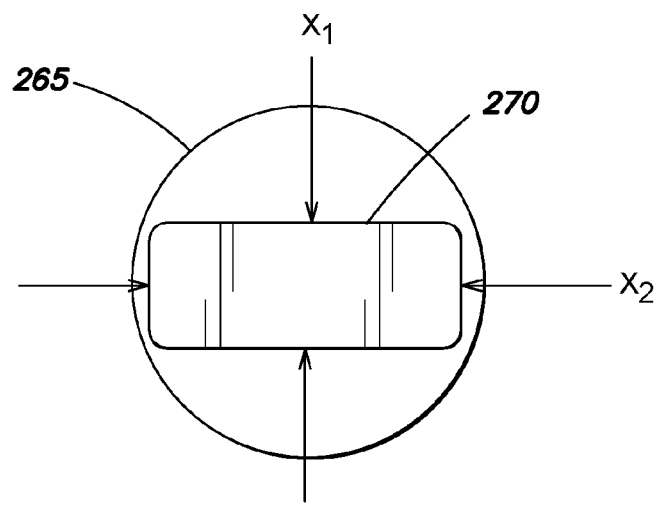
FIG. 5G is a plan view from beneath the spreader knob of the headband spring of FIG. 5F.
Figure 5H:
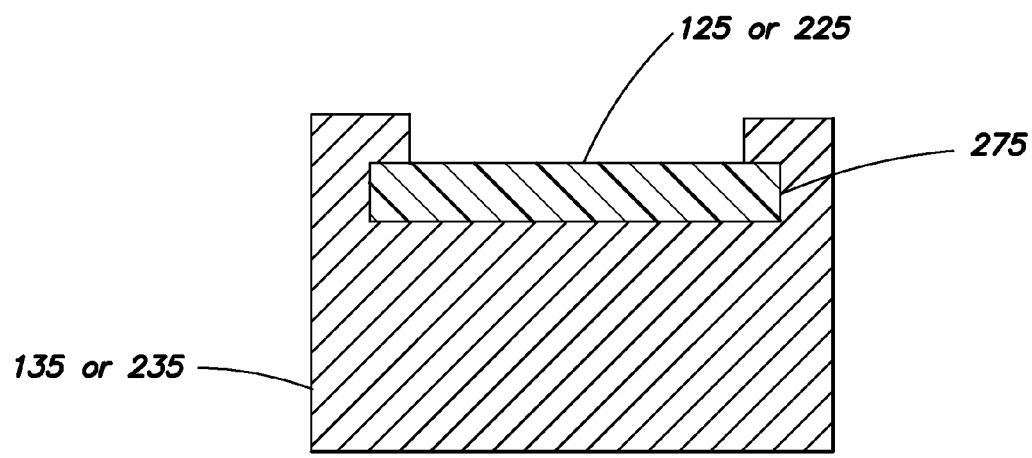
FIG. 5H is a cross-sectional view through the headband spring of FIG. 5F along line H-H.

In another example, as illustrated in FIG. 5F and FIG. 5G, the material strip 235 may be split into two portions and an adjustable spreader mechanism, for example, spreader knob 265 may be mounted in a gap formed between the two portions of the material strip 235. A base portion 270 of the spreader knob 265 may be thinner in a first direction $X_1$ than in a second direction $X_2$. Turning of the spreader knob 265 to dispose either the thinner or the thicker portion of the base portion 270 between the two portions of the material strip 235 would bias the two portions of the material strip apart to different extents, thus providing for changing an effective length and/or state of compression of the two portions of the material strip 235 and thus adjusting the state of openness of the headband spring 230 when not worn on a user's head and/or adjusting the tension applied to the user's head when the headband spring 230 is worn. In some examples, the portions of the strip 235 may slide along the headband spring element 225 and maintain contact with the headband spring element 225 by being pressed against the headband spring element 225 by a housing (not shown) of the headband. In other examples, the portions of the strip 235 may slide along the headband spring element 225 while being retained in notches or recesses 275 formed in the portions of the strip 235 as illustrated in FIG. 5H. Other examples of mechanisms for adjusting a distance between the two portions of the material strip 235 are also contemplated, for example, a screw passing through the ends of the two portions of the material strip 235 that may be turned to adjust the spacing between the two portions of the material strip 235.

Having thus described several aspects of at least one implementation, it is to be appreciated various alterations, modifications, and improvements will readily occur to those skilled in the art. Such alterations, modifications, and improvements are intended to be part of this disclosure, and are intended to be within the spirit and scope of the disclosure. One or more features of any one example disclosed herein may be combined with or substituted for one or more features of any other example disclosed. Accordingly, the foregoing description and drawings are by way of example only.

The phraseology and terminology used herein is for the purpose of description and should not be regarded as limiting. As used herein, the term "plurality" refers to two or more items or components. As used herein, dimensions which are described as being "substantially similar" should be considered to be within about 25% of one another. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A compliant constrained headband spring of a headband for audio headphones, the compliant constrained headband spring comprising:
   a headband spring element; and
   a stiffness enhancing element coupled to a retainer block coupled to the headband spring element and disposed on the headband spring element in at least a central region of the headband spring element, a terminal end of the stiffness enhancing element disposed within a groove in the retainer block and comprising a portion with a cross-sectional area greater than a cross-sectional area of a central portion of the stiffness enhancing element, the terminal end of the stiffness enhancing element configured to travel through the groove as the compliant constrained headband spring is opened and/or closed, the compliant constrained headband spring exhibiting a first stiffness in an open position and a second stiffness greater than the first stiffness when closed beyond a predefined point at which terminal ends of the headband spring element are at a predefined distance from one another.

2. The compliant constrained headband spring of claim 1, wherein, in the absence of external force and in the absence of the stiffness enhancing element, the headband spring element closes to a point at which earcups mounted on the terminal ends of the headband spring element contact one another, and wherein the stiffness enhancing element has sufficient stiffness to prevent the compliant constrained headband spring from closing to a point at which earcups mounted on the terminal ends of the headband spring element contact one another.

3. The compliant constrained headband spring of claim 1, wherein the predefined distance is within a range of between about 50 mm and about 121 mm.

4. The compliant constrained headband spring of claim 1, wherein the stiffness enhancing element comprises a strap coupled to the headband spring element at connection points on opposing sides of the headband spring element.

5. The compliant constrained headband spring of claim 1, further comprising a feature to adjust an effective length of the stiffness enhancing element.

6. The compliant constrained headband spring of claim 5, wherein the feature comprises a threaded screw disposed in the retainer block that engages threads on the terminal end of the stiffness enhancing element.

7. The compliant constrained headband spring of claim 5, wherein the feature comprises a plurality of apertures defined in the headband spring element at different distances from a center portion of the headband spring element, the plurality of apertures configured to releasably retain a base of the retainer block.

8. The compliant constrained headband spring of claim 1, wherein the stiffness enhancing element is coupled to the headband spring element at connection points on opposing sides of the headband spring element.

9. The compliant constrained headband spring of claim 8, wherein the stiffness enhancing element is configured to displace from the central region of the headband spring element upon opening of the headphones, forming a gap between a surface of the headband spring element and the stiffness enhancing element.

10. The compliant constrained headband spring of claim 1, wherein the stiffness enhancing element comprises at least one of a fiber reinforced polymer, a metal, a wire, an elastomeric material or a braided cable.

11. The compliant constrained headband spring of claim 1, included in a pair of audio headphones.

12. A compliant constrained headband spring of a headband for audio headphones, the compliant constrained headband spring comprising:
a headband spring element;
a stiffness enhancing element coupled to a retainer block coupled to the headband spring element and disposed on the headband spring element in at least a central region of the headband spring element, the compliant constrained headband spring exhibiting a first stiffness in an open position and a second stiffness greater than the first stiffness when closed beyond a predefined point at which terminal ends of the headband spring element are at a predefined distance from one another; and
a feature to adjust an effective length of the stiffness enhancing element, the feature comprising a threaded screw disposed in the retainer block that engages threads on a terminal end of the stiffness enhancing element.

13. The compliant constrained headband spring of claim 12, wherein the terminal end of the stiffness enhancing element comprises a portion with a cross-sectional area greater than a cross-sectional area of a central portion of the stiffness enhancing element.

14. The compliant constrained headband spring of claim 13, wherein the terminal end of the stiffness enhancing element is disposed within a groove in the retainer block.

15. The compliant constrained headband spring of claim 14, wherein the terminal end of the stiffness enhancing element is configured to travel through the groove as the compliant constrained headband spring is opened and/or closed.

16. The compliant constrained headband spring of claim 15, wherein the terminal end of the stiffness enhancing element is retained in the retainer block by a shoulder defined in the retainer block.

17. A compliant constrained headband spring of a headband for audio headphones, the compliant constrained headband spring comprising:
a headband spring element;
a stiffness enhancing element coupled to a retainer block coupled to the headband spring element and disposed on the headband spring element in at least a central region of the headband spring element, the compliant constrained headband spring exhibiting a first stiffness in an open position and a second stiffness greater than the first stiffness when closed beyond a predefined point at which terminal ends of the headband spring element are at a predefined distance from one another; and
a feature to adjust an effective length of the stiffness enhancing element, the feature comprising a plurality of apertures defined in the headband spring element at different distances from a center portion of the headband spring element, the plurality of apertures configured to releasably retain a base of the retainer block.

* * * * *